(12) United States Patent  
Musser, Jr.

(10) Patent No.: US 11,386,642 B2  
(45) Date of Patent: Jul. 12, 2022

(54) IMAGE DIFFERENCE DETECTION

(71) Applicant: Home Box Office, Inc., New York, NY (US)

(72) Inventor: Elmer G. Musser, Jr., Northport, NY (US)

(73) Assignee: Home Box Office, Inc., New York, NY (US)

( * ) Notice: Subject to any disclaimer, the term of this patent is extended or adjusted under 35 U.S.C. 154(b) by 85 days.

(21) Appl. No.: 17/068,045

(22) Filed: Oct. 12, 2020

(65) Prior Publication Data

US 2022/0114378 A1 Apr. 14, 2022

(51) Int. Cl.
*G06V 10/75* (2022.01)
*G06K 9/62* (2022.01)
*G06V 10/32* (2022.01)
*G06V 20/40* (2022.01)

(52) U.S. Cl.
CPC ......... *G06V 10/751* (2022.01); *G06K 9/6215* (2013.01); *G06V 10/32* (2022.01); *G06V 20/46* (2022.01); *G06V 20/48* (2022.01)

(58) Field of Classification Search
CPC ......... G06T 2207/10016; G06T 3/0012; G06T 3/40; G06T 3/4007; G06T 3/4023; G06T 3/403; G06T 3/4053; G06T 7/13; G06T 7/0085; H04N 1/393; H04N 1/3935; G06V 10/751; G06K 9/6202
See application file for complete search history.

(56) References Cited

U.S. PATENT DOCUMENTS

2015/0302551 A1* 10/2015 Huang ................. G06V 10/751  
    382/199  
2016/0044315 A1* 2/2016 Sun ..................... H04N 19/154  
    375/240.02

\* cited by examiner

*Primary Examiner* — Manuchehr Rahmjoo  
(74) *Attorney, Agent, or Firm* — Amin, Turocy & Watson, LLP

(57) ABSTRACT

The described technology is generally directed towards comparing two images for content differences, such as images based on the frames of a show and a derivative version of that show. Frame pairs such as from an original show and its derivative version are processed into image pairs, which can include decoding, scaling, luminance extraction and/or filtering. An edge pixel image is obtained via edge detection for each image. Edge pixels in one image are compared against a counterpart edge pixel (and possibly neighboring pixels) in the other image to determine matches (matching edge pixels) and mismatches. An image with too many errors based on the mismatches is deemed as a candidate for further review. A difference image can be generated to assist a reviewer in detecting where the mismatches were detected. By repeating for the various frames, a show can be automatically compared against its derivative for content differences.

20 Claims, 13 Drawing Sheets

IMAGE DIFFERENCE DETECTION

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

During the post production of a show such as a movie or television program, variations (derivative versions) of the show are typically created, such as a high definition (1920× 1080) resolution version derived from an ultra high definition (3840×2160) resolution original, for example. Other variations of a show can be based on different color spaces, different EOTFs (electro optical transfer functions) and so on.

Any differences between the variations of a show tend to be disapprovingly noticed by the viewing audience, as viewers may recollect and/or discuss with others past viewings where a key object or face was present in an original scene, but did not appear in the derivative version. For example, if scaling or panning is performed, such as is often done with a lower definition resolution version derived from a higher definition resolution version, something significant (e.g., a face, a bottle and so forth) can be missing in the derived version. Further, something such as a misspelling in the credits or other text can be fixed in the original, but this fix does not always get transferred to a previously derived copy.

Peak signal-to-noise-ratio comparisons and the like do not do very well in identifying such differences. Moreover, such techniques do not work in different domains, including different resolutions. Thus, a present solution is to have one or more human reviewers watch a show and its derivative version side by side, and note where differences are observed, so that they can be fixed by the studio or the like that regenerates the different variations. This manual solution is resource intensive and tedious, and thus also can result in both subtle and significant differences being missed.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
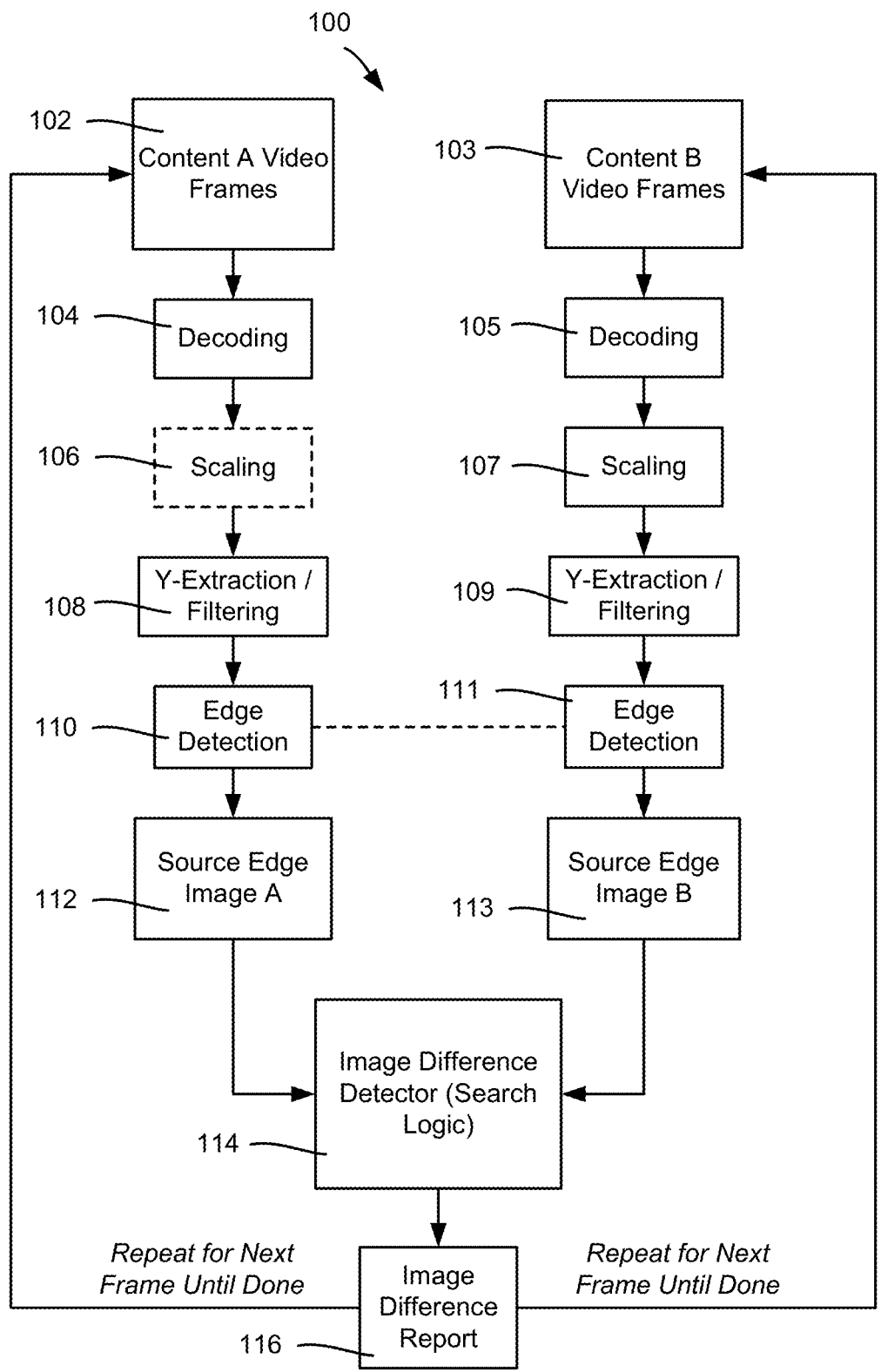
FIG. 1 is an example block diagram representation of components that provide edge images for content comparison, in accordance with various aspects and example implementations of the subject disclosure.

Various aspects described herein are generally directed towards a technology in which two images (e.g., corresponding frames of a show and a derivative show) are compared for content in a manner that is not influenced by the size or color of the image. To this end, edge detection provides converted frames of primary (e.g., original) and secondary (e.g., derived) video content that a computer can match up and score. Rather than detecting differences in brightness or relative color, edge detection results in detecting image differences, including a font change or missing object.

Before edge detection and matching, the video content can be filtered to remove noise, such as unnoticeable to a viewer but possibly otherwise detected by the automated comparison process. Further, scaling can be performed to get the frames to be the same size and resolution so edge pixels can be matched.

Following edge detection, the edge pixels in each frame are automatically compared, which can be expanded using a searching technique that compares a selected edge pixel in one frame with its counterpart pixel (and possibly neighboring pixels) in the other frame, to look for a similar edge. In one implementation, the count of mismatches to the count of matches provides a ratio that can be is evaluated to determine whether a threshold ratio is exceeded. Alternatively, the ratio can be based on the number of mismatches to the total number of edge pixels. Those frames with too many edge differences are automatically reported. In this way, a human observer or team of observers can quickly advance to the frames (or scenes of multiple frames) where the differences can be confirmed as needing to be fixed or deemed not significant.

Further, following pixel matching, a visible representation of any two frames deemed different can be provided to guide the reviewer in seeing the differences. For example, the two edge pixel frames (e.g., with white pixels showing edges, and black pixels showing non-edges), can be overlaid on one another, with the mismatched edge pixels shown as different color pixels, such as red. Thus, not only can a reviewer receive a report as to which frame (or scene of frames) to further inspect, but the technology can assist the reviewer in honing in on the detected differences.

It should be understood that any of the examples herein are non-limiting. For instance, a higher resolution image can be scaled down to a lower resolution, or vice-versa, and thus which video content is the primary image (which may or may not be the original) and which is the secondary image (which may or may not be the derivative but can be the original) is interchangeable as used herein. As another alternative, it is possible to use techniques such as scene detection to avoid having to match every frame, although the technology described herein that matches frame-by-frame is highly efficient and consistent compared to manual viewing, and can find differences in as little as a single frame. As such, the technology described herein is not limited to any particular embodiments, aspects, concepts, structures, functionalities, values or examples described herein. Rather, any of the embodiments, aspects, concepts, structures, functionalities or examples described herein are non-limiting, and the present technology may be used in various ways that provide benefits and advantages in image difference detection in general.

FIG. 1 is a generalized block diagram representation of an example system 100 in which the video frames 102 of content A are to be compared, e.g., on a frame-by-frame basis as described herein, with the video frames 103 of content B. In general, content B's video frames 103 have been obtained from a variation previously derived from content A, or vice versa. It is also feasible that content A and content B are both derivative versions of some other video content, although not having a master source could lead to both derivative versions having the same mismatch in a given frame, which would not be detected as a mismatch.

In the example of FIG. 1, as represented by respective blocks 104 and 105 each frame of the content A's video frames 102 are decoded, as are those of content B's video frames 103. Blocks 106 and 107 represent scaling the images to match, although note that only one of the images may need to be scaled to match the other. In this way, the images are resolution independent; for example, the images can be automatically scaled to UHD to ensure a high resolution. Notwithstanding, the image sizes can be scaled to other values if desired, such as to a lower resolution with fewer pixels to process, to thereby obtain faster results.

The following shows example scaling code:

```
// scaling frag,
printf("\nScaling processing %d %d %d %d ", image->h,
image->w, orows, ocols);
    fflush(stdout);
    for(x=0; x < ocols; x++) {
      for(y=0; y < orows; y++)
        float gx = x / (float)(ocols) * ((image->w)-1);
        float gy = y / (float)(orows) * ((image->h-1);
        // assemble picture
        float result = interp(image, gx, gy); // interpolation call
        putpixel(dst, x, y, result, 1, 0);
      }
    }
}
```

Blocks 108 and 109 represent further preliminary preparation of the images, namely luminance (Y) extraction and filtering. More particularly, as part of preparing the images, the images can be converted to luminance (Y), as color contains no real image information. For example, if a frame shows grass, whether the grass tends more towards green or brown does not change the fact that the images contain grass. The same process can be applied to the other image. Variations can be applied to produce desired images, e.g., Lift, Gamma, Gain and so on can be varied and applied. In one implementation, the setting(s) are only done once for each source type rather than for each frame.

With respect to filtering, such as after luminance (Y) is extracted, a filter can be applied to help reduce noise that can be confusing with respect to the actual picture content. As one example, a show may have film grain, which will cause subsequent edge detection to act differently in the presence of noise. Thus, a filter can be applied to remove some of the noise; sampling the picture and removing some of the noise improves the edge quality. For example, high definition resolution images are generally different from standard definition resolution images, as high definition resolution can be peaking at 4000 nits while standard definition resolution may only hit 100 nits. This difference can be dealt with via a certain amount of automatic adjustment. In one implementation, the following filter code can be used:

```
// filter frag
void averagefilter(unsigned char **xc, unsigned char **map, int nrows,
int ncols)
    {
      image *collection = (image *)malloc(sizeof(image));
      collection->h = nrows;
      collection->w = ncols;
      collection->pixels = (unsigned short *)malloc(sizeof(unsigned
      short) * ncols * nrows);
      image *dst = (image *)malloc(sizeof(image));
      dst->h = 5;
      dst->w = 5;
      dst->pixels = (unsigned short *)malloc(sizeof(unsigned short) *
      5 * 5);
      int k = 0;
      int i, j;
        for(i = 0; i < nrows; i++)
          {
          for(j = 0; j < ncols; j++)
            {
              k = j + (i * ncols);
              collection->pixels[k] = xc[i][j] ;
            }
          }
    for(i=5; i<nrows-5; i++)
      {
      for(j=5; j<ncols-5; j++)
        {
          window(collection, dst, j, i, j+5, i+5);
          map[i-2][j-2] = average(dst->pixels, 25);
        }
      }
// bubble_sort(dst->pixels, 25);
free(dst->pixels);
free(collection);
free(dst);
}
```

In one implementation, the window function, called by the filter code, sets the window in which a desired edge is obtained:

```
// function, obtain a group of pixels
// image is a structure, *pixels, int width, int height
```

```
void window(image *src, image *dst, int x0, int y0, int x1, int
   y1) {
    int srcPos = 0;
    int dstPos = 0;
    int width = 0;
    int height = 0;
    if(x0>x1) {
        fprintf( stderr, "FAILED in function %s of file
           %s on line %d:\nx0 > x1 %d %d\n",
        _FUNCTION_, _FILE_, _LINE_, x0, x1);
            return;
    }
    if(y0>y1) {
        fprintf( stderr, "FAILED in function %s of file
           %s on line %d:\ny0 > y1\n",
        _FUNCTION_, _FILE_, _LINE_ );
            return;
    }
    if(x1-x0 < 0) {
        fprintf( stderr, "FAILED in function %s of file
           %s on line %d:\nx1-x0 < 0\n",
        _FUNCTION_, _FILE_, _LINE_ );
            return;
    }
    if(y1-y0 < 0) {
        fprintf( stderr, "FAILED in function %s of file
           %s on line %d:\ny1-y0 > dst->h\n",
        _FUNCTION_, _FILE_, _LINE_ );
            return;
    }
    for(int h=y0; h<y1 ; h++){
        width = 0;
        for(int w=x0; w<x1; w++) {
            srcPos = w + (h * (src->w));
            dstPos = width + (height * dst->w);
            dst->pixels[dstPos] = src->pixels[srcPos];
            width++;
        }
        height++;
    }
    return;
}
```

Following noise reduction by Y-extraction and filtering as described herein, an edge detection process is applied to each image, as represented by blocks 110 and 111. Any edge detector can be used, although in one implementation the well-known Sobel Edge detector process has been found to provide suitable results.

As part of the edge detection is process, initial results can be visibly as well as automatically reviewed, and further adjustments can be applied if needed until a suitably defined edge is obtained. For example, if not enough edge pixels exist in an image following edge detection to provide a workable image, adjustments can be made to increase the number of edge pixels. The result is two edge (edge/non-edge) source images 112 and 113, in which, for example, edges are represented via white pixels and non-edges are represented via black pixels.

Figure 2:
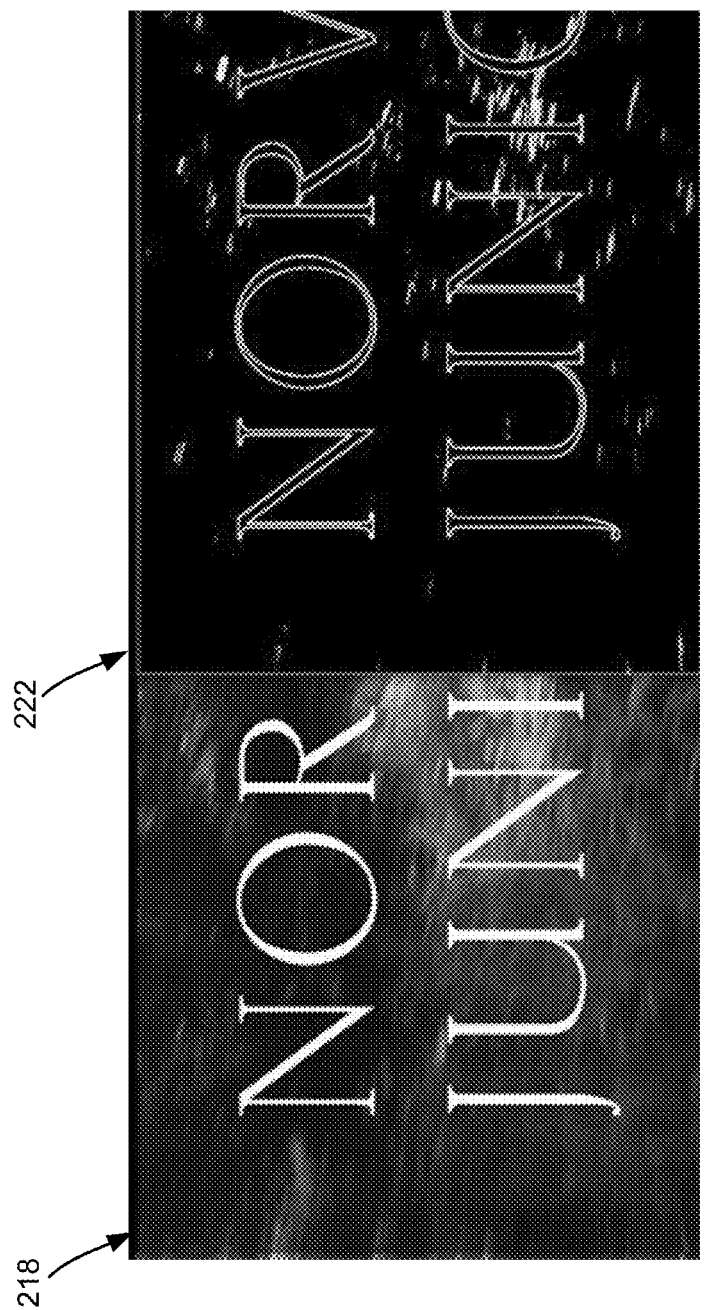
FIG. 2 is an example representation of a source image and an edge pixel image obtained therefrom, in accordance with various aspects and example implementations of the subject disclosure.

By way of example, FIG. 2 shows a side by side representation of part of a source image 218 alongside part of a modified image 222 following edge detection (as well as scaling and filtering as described above); the modified image 222 can correspond to the source edge image 112 of FIG. 1, for example. Edge pixels are white, and non-edge pixels are black. Although not separately shown, it is understood that a similar counterpart image of edge pixels is obtained from the counterpart frame in the other show (e.g., derivative version or original) being compared, such as corresponding to the source edge image 113 of FIG. 1.

Returning to FIG. 1, with the two edge images 112 and 113, a search of the matching pixels is made as represented by an image difference detector (search logic) 114. In one implementation, the search window can be adjusted to broaden the search area, e.g., by comparing a pixel against a counterpart pixel and one or more of its neighboring pixels. Making the search too broad reduces the ability to find small changes in the image, but can be useful in some scenarios, depending on what is being looked for in the two images.

In one implementation, the difference between the two images can be represented by a score, generally by counting edge pixels that match and edge pixels that did not match, and obtaining a ratio (e.g., an error percentage). The score for the frame pairs can be maintained in an image difference report 116. Note that rather than evaluating a fixed non-matching value versus a count threshold value, the ratio/error percentage generally provides a more useful indicator, because some images have a lot of edges (and thus likely more mismatches) while some images do not have many edges (and thus likely less mismatches).

The error percentage is then evaluated against a threshold ratio value. If the error percentage is above the threshold ratio value, the frame corresponding to the difference image (e.g., the counterpart frame) can be flagged as an error candidate, (e.g., based on data in the final image difference report, and/or in a graphical representation thereof) for further review.

Figure 3:
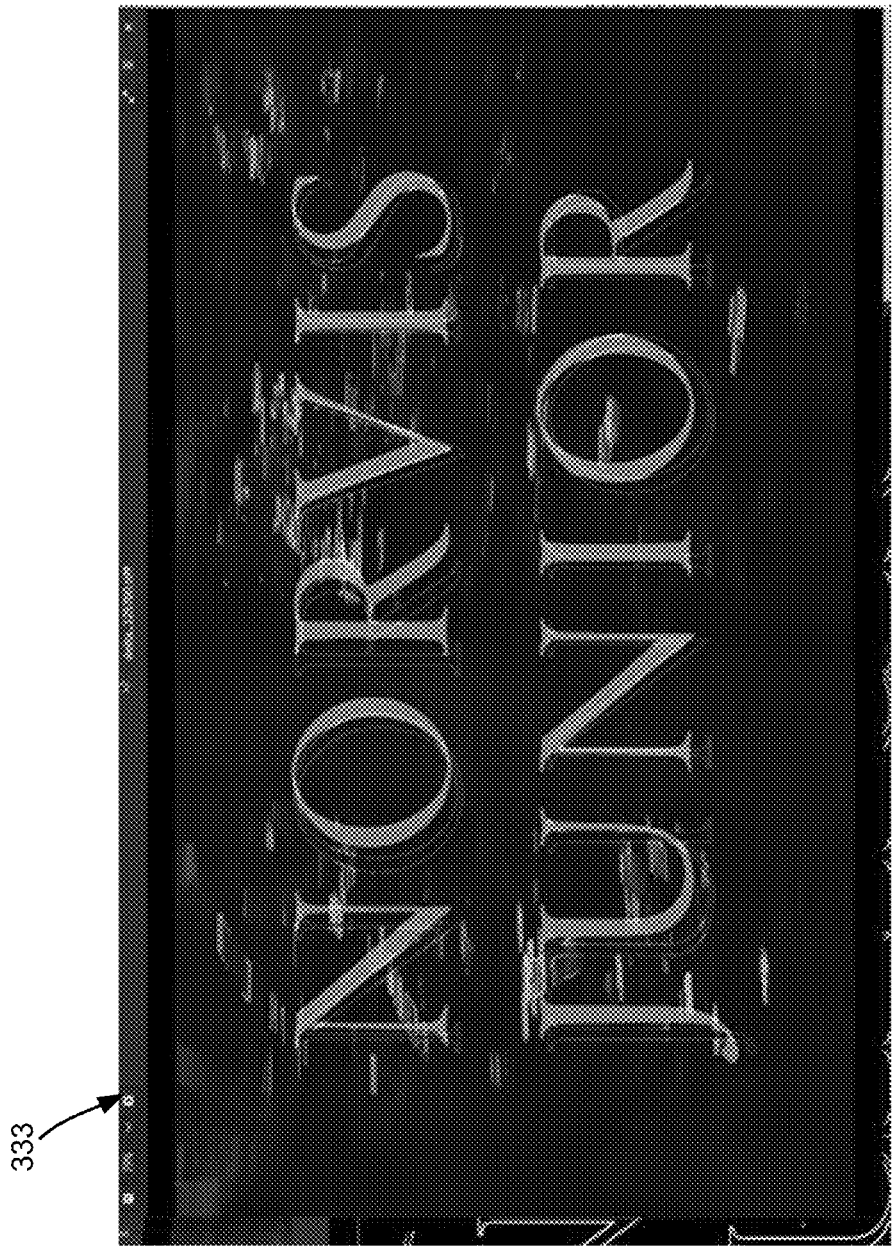
FIG. 3 is an example representation of an error image generated from the differences between two images, overlaid on an actual image, in accordance with various aspects and example implementations of the subject disclosure.

As an added benefit to a reviewer, if the error percentage is above the threshold ratio value, the image can be further processed to show the reviewer what has made this image fail. For example, the target (secondary) source can be overlaid with the matched and unmatched test results, with red pixels highlighting the error detected. FIG. 3 shows a full image 333 (generally corresponding to FIG. 2) that has failed due to font differences; indeed, only the graphic is bad, as white pixels are matching pixels. The overlaid images can be created on demand, and/or can be automatically generated and included in or associated with the image difference report 116.

As can be readily appreciated, any of the operations of the blocks in FIG. 1 can be performed in advance or in parallel, at least to an extent, possibly on multiple devices. For example, a show can be broken up into many short segments and with multithreading and/or parallel devices, the processing/logic described herein allow working on those separate segments at the same time. The various reported data can be sorted back into frame order to obtain a final report.

Figure 4:
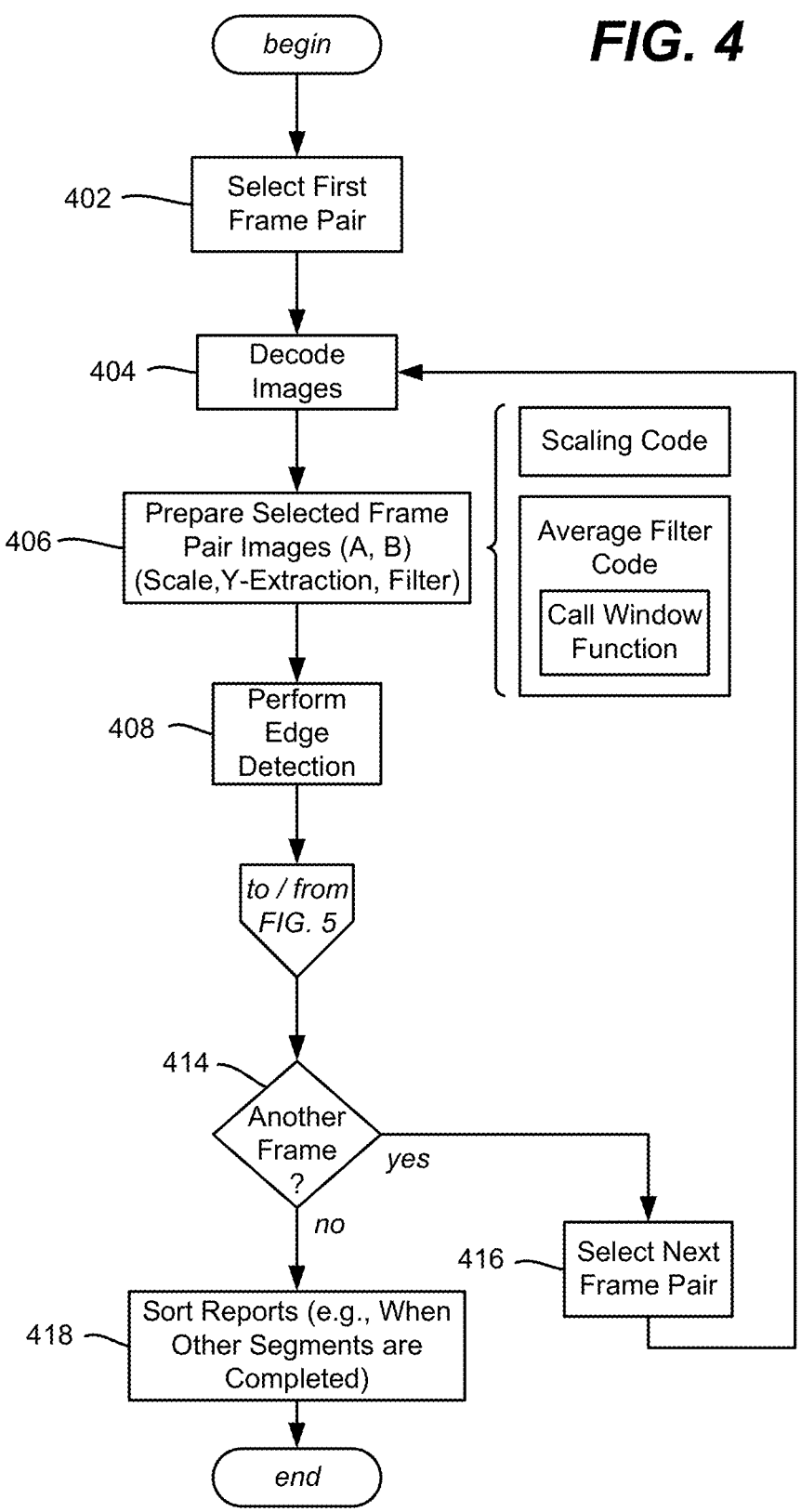
FIGS. 4 and 5 comprise a flow diagram of example operations that may be performed to compare two images for content differences, in accordance with various aspects and example implementations of the subject disclosure.
Figure 5:
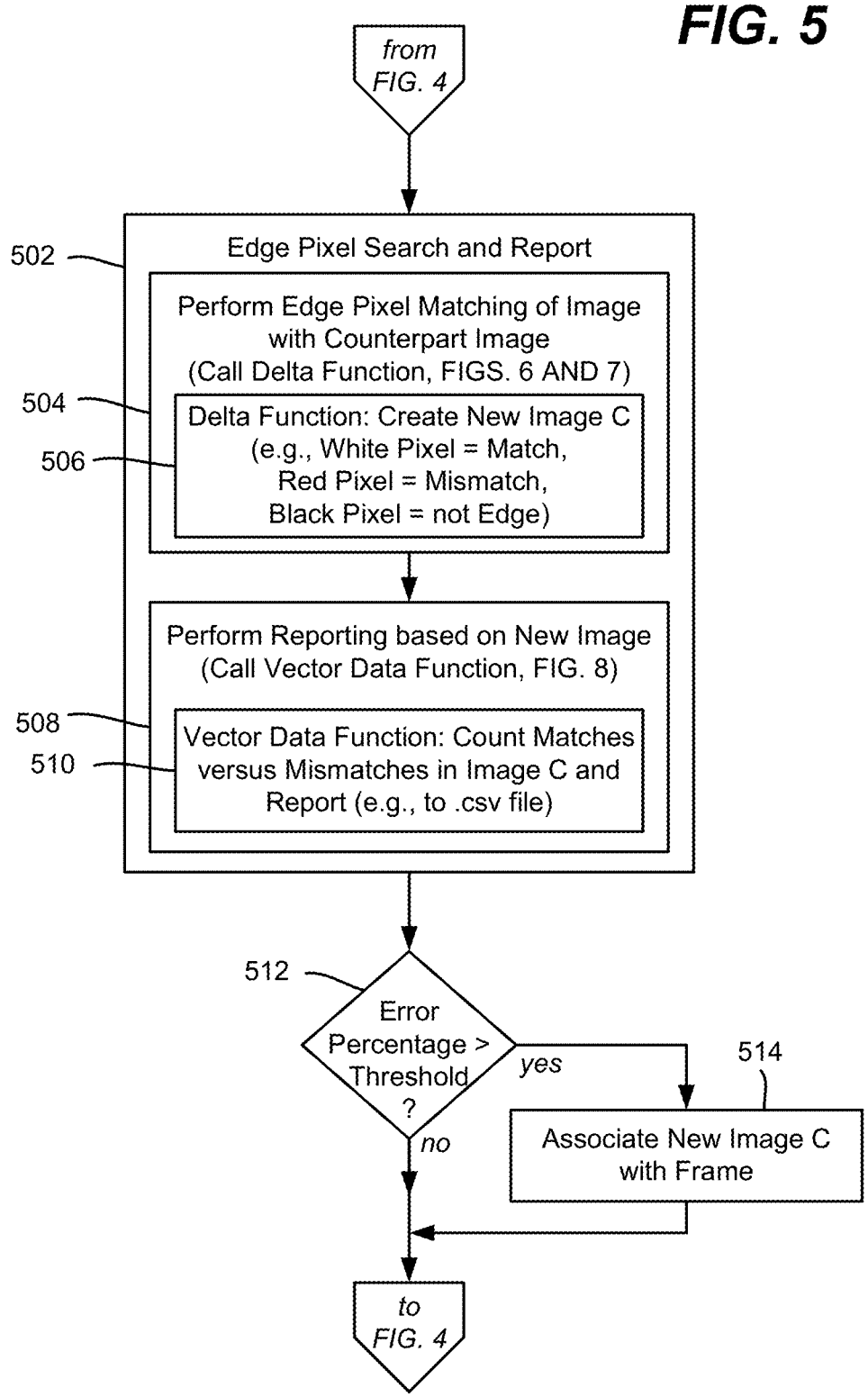

FIGS. 4 and 5 show example operations similar to those performed by the components of FIG. 1. As set forth herein, the operations of FIGS. 4 and 5 can be applied to an entire show, or on some short segment or segments of a show in parallel with similar operations by other threads/devices.

Operation 402 of FIG. 4 represents selecting the first frame pair, one frame from the original show and one frame from the derivative version. Operation 404 decodes those frames into images, e.g., images A and B. Operation 406 represents preparing those images, such as by scaling, luminance extraction and filtering as described herein. Note that any part of operation 406 can be repeated and tweaked as desired, whether automatically or manually, or a combination of both, until desired images are obtained; however as described herein, this is typically only done once and applies to the subsequent images of the short segment being processed or possibly the entire show.

Operation 408 represents performing the edge detection. At this time, both images comprise a combination of edge pixels (e.g., white) and non-edge pixels (e.g., black). The process then continues to operation 502 of FIG. 5.

Operation 502 represents performing the edge pixel matching of the image with the counterpart image (operations 504 and 506) to build a new image C containing edge pixel matches (e.g., white pixels) and edge pixel mismatches (e.g., red pixels), as well as non-edge pixels (black pixels). In general, one image is selected as the source image, and for each edge pixel, a search is performed on the counterpart image to determine if there is a match or mismatch, which is then used to generate the new image C. An example of searching to build a new image is detailed in FIGS. 6 and 7.

Operations 508 and 510 represent scanning the new image to count matches and mismatches to obtain an error percentage ratio) as described herein. This information is saved to a file, such as a comma separated value (.csv) file for importing into a spreadsheet or the like. If the error percentage is greater than the error threshold, which a human operator can configure, the new image C is associated with the frame number for further review. Note that this is only one example implementation, and, for example, the generated image data with errors can be maintained for at least some images that do not meet the threshold error percentage, in case the operator wants to modify the threshold error percentage without re-running the entire process.

The process exemplified in FIGS. 4 and 5 returns to operation 414 to repeat for the next frame (operation 416) until there are no more frames in this segment (which can be the entire show if parallel operations are not performed). Operation 418 represents sorting the reports, which can wait until other (parallel processed) segments have similarly completed. To this end, for example, the various individual reports can be written into a single file, e.g., which can be imported into a spreadsheet for sorting by frame number. The results for the frames can be graphed, showing where errors spike and/or tend to congregate, e.g., for a larger scene having errors. The graph can be interactive, allowing a user to navigate through the frames of the two video shows side-by-side, as well as view the new error image C created based on those frames, by sliding over the graph, for example. A frame number (or timecode) entry field can also be used to jump directly to the two paired frames and their related error image.

Figure 6:
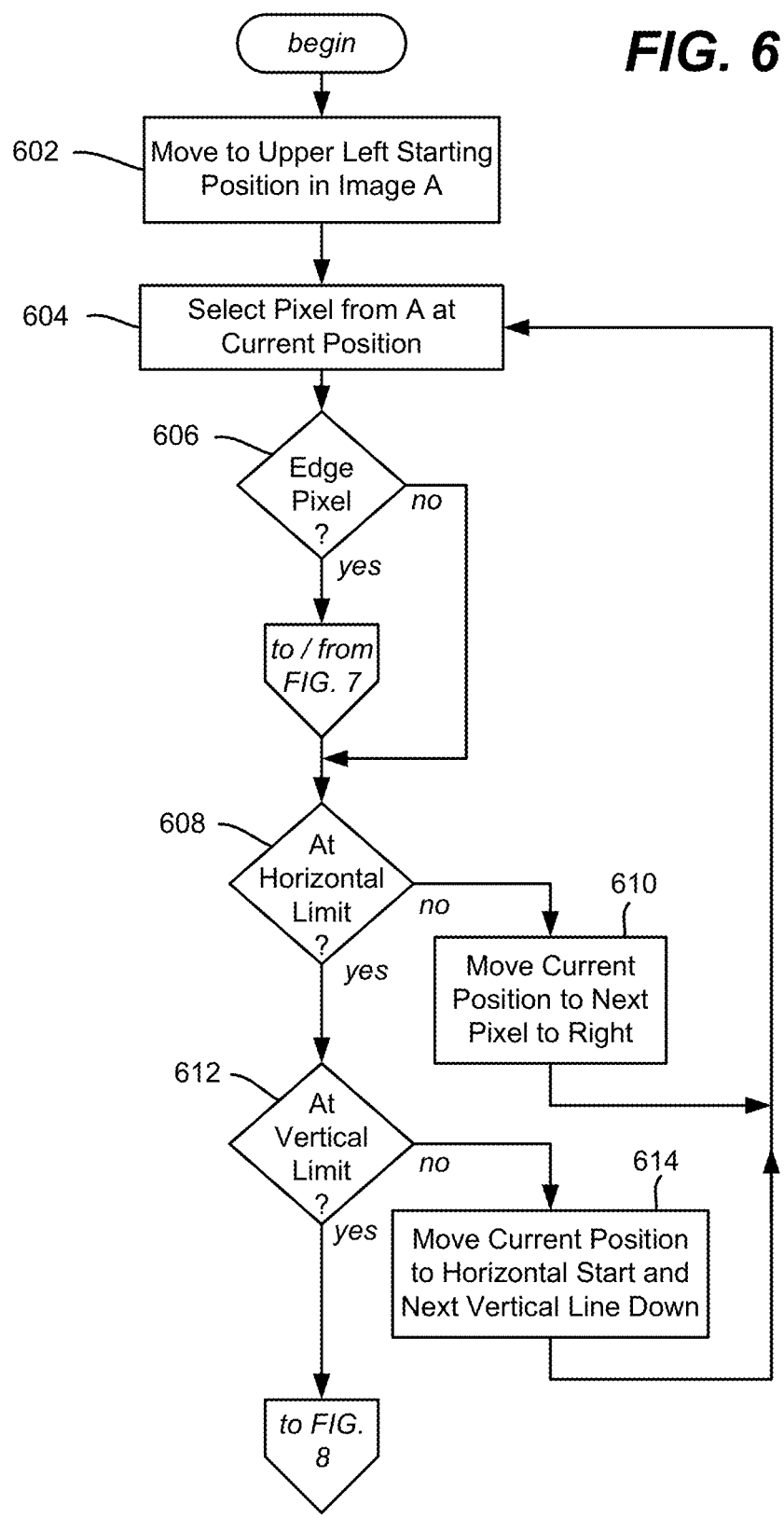
FIGS. 6 and 7 comprise a flow diagram showing example operations related to searching a counterpart image for a matching edge pixel and generating a difference image, in accordance with various aspects and example implementations of the subject disclosure.
Figure 7:
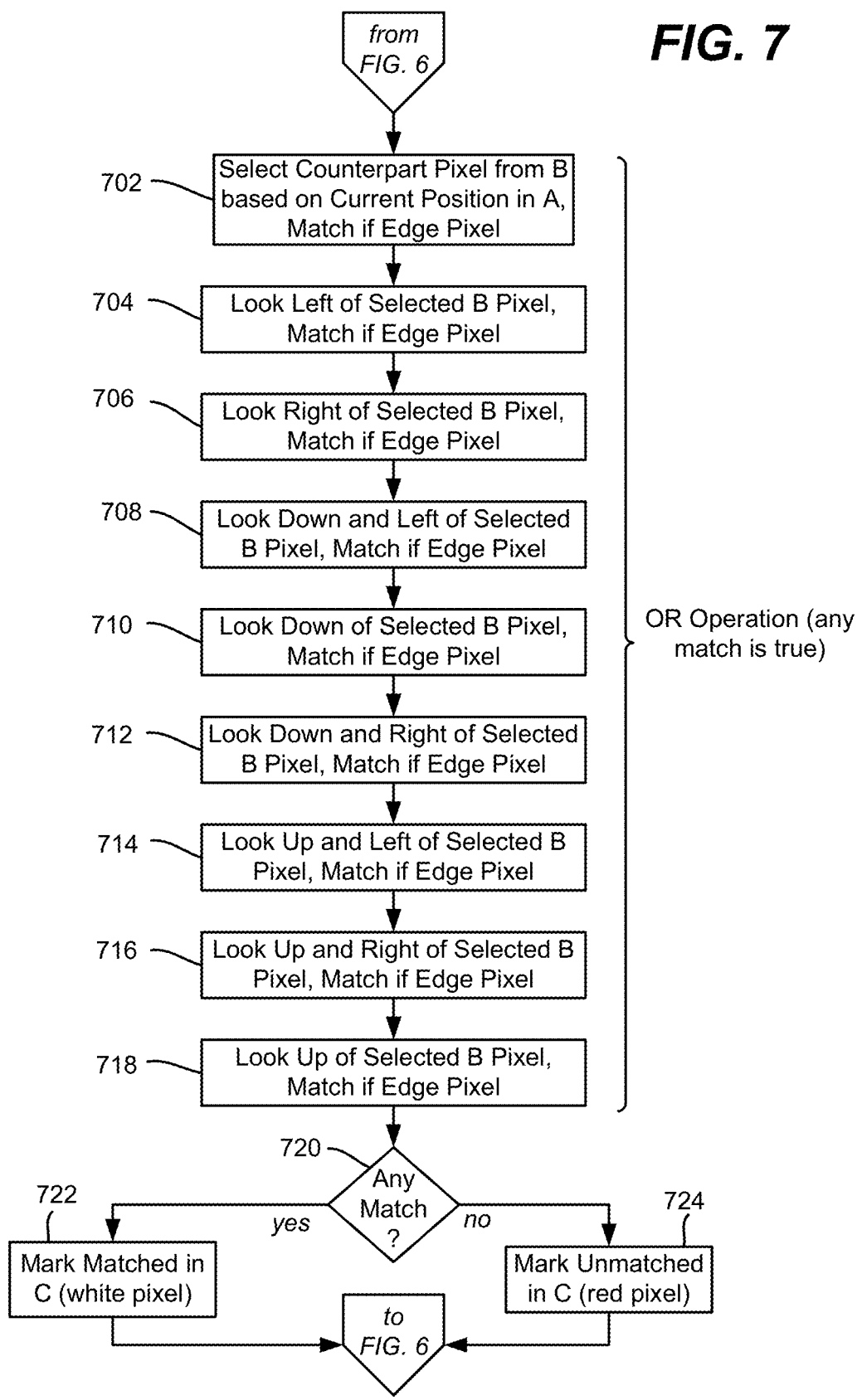

FIGS. 6 and 7 show additional details of one example search implementation in which a selected edge pixel from one image is compared against a counterpart pixel in the other image, along with the counterpart pixel's neighboring pixels. In this example the search window area expands to evaluate the neighbors, namely the upper left pixel, upper pixel, upper right pixel, left pixel, right pixel, lower left pixel, lower pixel and lower right pixel. As is understood, this search window area can be increased or decreased relative to this example. As is also understood, the searching operations create a new image C, which can be initially set to one color (e.g., all black) or left transparent, with matches resulting in a white pixel being written and mismatches resulting in a red pixel being written.

Operation 602 moves to set the first pixel in the source frame as the current position. Note that a region of interest can be defined by the operator. In this way, the window of what is deemed important to review can be made to be less than the entire frame. Alternatively, a frame can be searched (e.g., with a different set of neighboring pixels) and/or scored differently (e.g., increment the match or mismatch counter by one if outside the region or two points inside the region) inside a defined region of interest (a "safe title area") versus outside the region of interest, for example. Setting for both percentage of width and percentage of height allows the operator to ignore the "edge" of a frame, or change how the edge area is searched and/or scored. Further, even if the "entire" frame is to be searched, an offset based on the number of neighboring counterpart can be used so that the search for a matching pixel never extends outside the counterpart frame boundary.

Operation 604 selects the pixel from the current position in the source frame. If the selected pixel is not an edge pixel (e.g., is not a white pixel) as evaluated at operation 606, the search is bypassed, with the current position modified and so on until the end of the frame boundary limit is reached.

When an edge pixel is detected, operation 606 branches to operation 702 of FIG. 7 where the counterpart pixel is selected. In this example, via steps 704 through 718, any edge pixel in the selected counterpart pixel or its neighbors are considered a match. Note that although not explicitly shown, any match can bypass further checks for a match. Alternatively, a simple coding operation can combine operations 606 and 704-718, e.g., if source is an edge pixel AND (counterpart pixel OR upper left pixel OR upper pixel OR upper right pixel OR left pixel OR right pixel OR lower left pixel OR lower pixel OR lower right pixel) is an edge pixel then MATCH else MISMATCH.

Operation 720 evaluates for a match, and if so, operation 722 writes a white pixel into the new image C. Otherwise, operation 724 writes a red pixel into the new image C, and the process returns to operation 608 of FIG. 6.

As can be seen, operations 608 and 610 move the current position to the next pixel in the horizontal direction until the right boundary, which along with the lower boundary can be set by the operator or by default as described herein, is reached. When reached, operations 612 and 614 reset the horizontal start position and move to the next line down in the vertical direction in this example. When both the horizontal and vertical limits have been reached, the search process is ended and the reporting process of FIG. 8 begins. Note that in this example search scanning occurs from upper left to upper right and then down, however any search/scanning directions can be used to obtain the same result. It is also feasible to sample (e.g., select every other pixel by moving the current position by two instead of one), however sampling can result in less accurate results.

Figure 8:
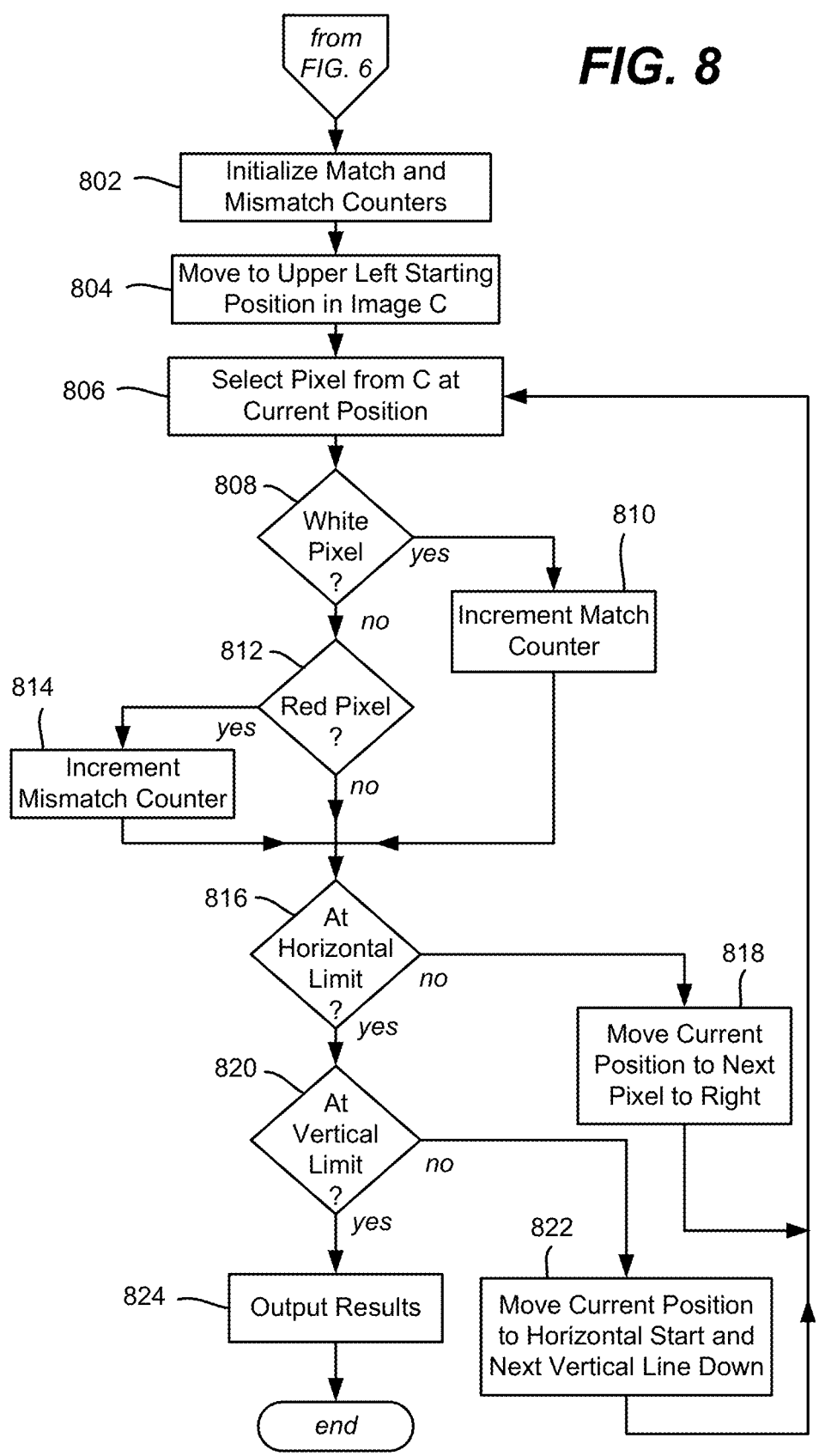
FIG. 8 is a flow diagram of example operations that may be performed to process a difference image into match and mismatch data, in accordance with various aspects and example implementations of the subject disclosure.

FIG. 8 represents the reporting process based on the new image C, beginning at operation 802 which initializes the match and mismatch counters, e.g., to zero. Operation 804 moves the current position to the starting upper left boundary, which is generally the first pixel because any region of interest was already determined when performing the search and generating the new image C.

Operation 806 selects the pixel at the current position, and if a white pixel at operation 808, increments the match counter at operation 810. If not a white pixel, operation 812 evaluates for a red pixel, and if red, increments the mismatch counter at operation 814. If neither red nor white, then the pixel is not an edge pixel and the process continues.

Operation 816 evaluates for the horizontal limit, ordinarily the last pixel in the horizontal direction in the new image C, and if not reached, moves the current position to the next pixel to the right. Otherwise operation 820 evaluates if the last pixel in the vertical direction had been reached, and if not, moves to the next line down and to the first pixel horizontally in the new line. As can be seen, each of the pixels in the new image are thus evaluated for white/match or red/mismatch, with the corresponding counters appropriately adjusted.

When finished, operation 824 outputs the results, which for example can include the frame number, the edge pixel count, non-edge pixel count, the mismatch count, the match count and/or the error percentage. Note that the counts themselves can be useful, e.g., even if frame pair has a lower error percentage that does not meet the threshold error level, an alternative implementation can further look for a very high mismatch count and flag that frame for further review.

In this way, the frame pairs are evaluated as source, counterpart edge pixel images for mismatches/errors. By using edges, the technology operates on frame content, generally ignoring color space and/or EOTF when making the comparison. The new image can be evaluated, or used as an overlay with an existing actual frame to highlight the differences as in FIG. 3.

Figure 9:
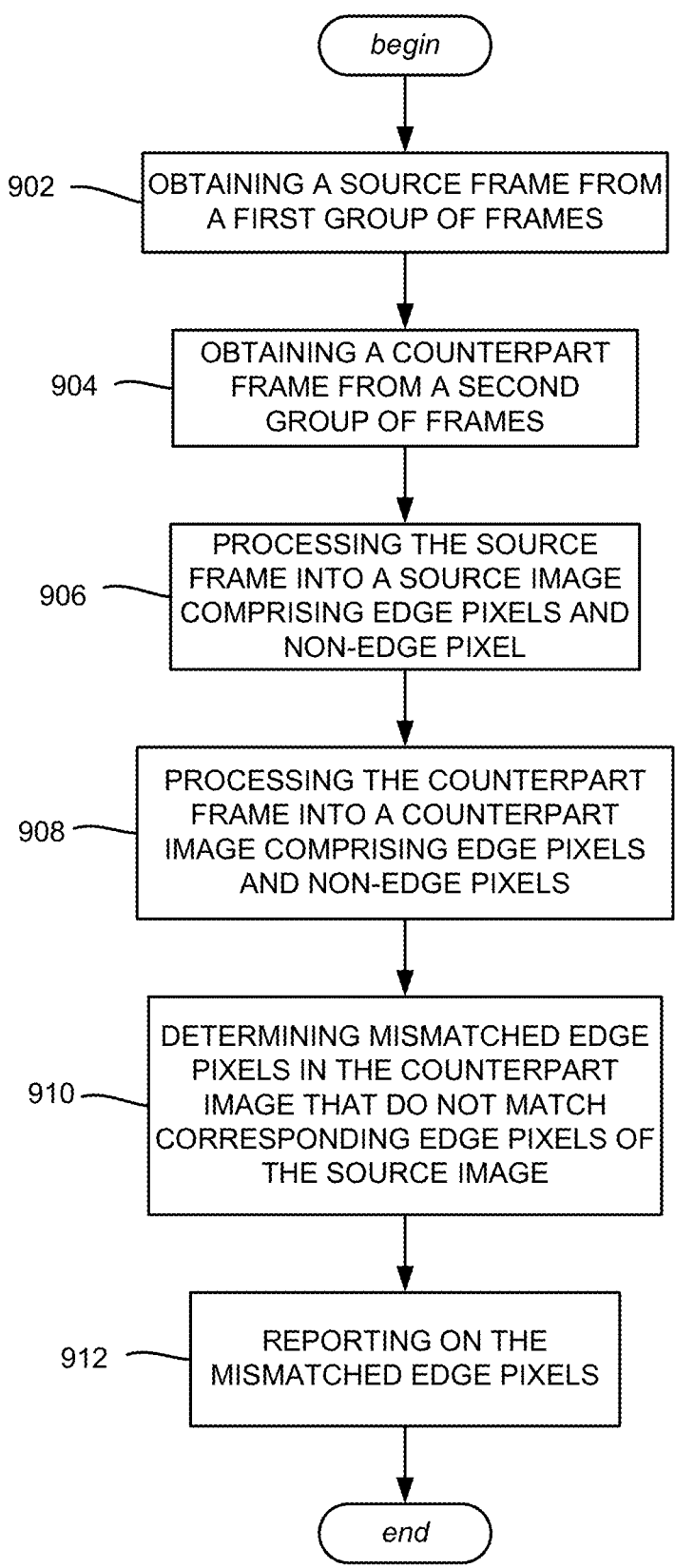
FIG. 9 is a flow diagram of example operations that determine and report on differences in images obtained from frames, in accordance with various aspects and example implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents obtaining a source frame from a first group of frames. Operation 904 represents obtaining a counterpart frame from a second group of frames. Operation 906 represents processing the source frame into a source image comprising edge pixels and non-edge pixels. Operation 908 represents processing the counterpart frame into a counterpart image comprising edge pixels and non-edge pixels. Operation 910 represents determining mismatched edge pixels in the counterpart image that do not match corresponding edge pixels of the source image. Operation 912 represents reporting on the mismatched edge pixels.

Determining the mismatched edge pixels in the counterpart image that do not match edge pixels of the source image can comprise, for an edge pixel of the source image, searching a corresponding pixel in the counterpart image to look for an edge pixel.

Determining the mismatched edge pixels in the counterpart image that do not match edge pixels of the source image can comprise, for an edge pixel of the source image, searching a corresponding pixel and at least one neighboring pixel of the corresponding pixel in the counterpart image to look for an edge pixel.

Determining the mismatched edge pixels in the counterpart image that do not match edge pixels of the source image can comprise generating a difference image of matched pixels and mismatched pixels. Reporting on the mismatched edge pixels can comprise counting the mismatched pixels in the difference image. Further operations can comprise evaluating an error percentage, based on the counting the mismatched pixels in the difference image, against a threshold error percentage, and if the threshold error percentage is exceeded, flagging the counterpart frame as an error candidate.

Processing the source frame into the source image can comprise decoding the source frame into the source image, and wherein the processing the counterpart frame into the counterpart image can comprise decoding the counterpart frame into the counterpart image.

Further operations can comprise scaling the counterpart image or scaling the source image. Further operations can comprise performing luminance extraction on the source image and performing luminance extraction on the counterpart image. Further operations can comprise filtering the source image and filtering the counterpart image.

Determining the mismatched edge pixels in the counterpart image comprise searching for mismatched edge pixels in a defined region of interest.

The first group of frames can comprise a segment of frames of an original show, and the second group of frames can comprise a corresponding segment of frames of a derivative of the original show.

Figure 10:
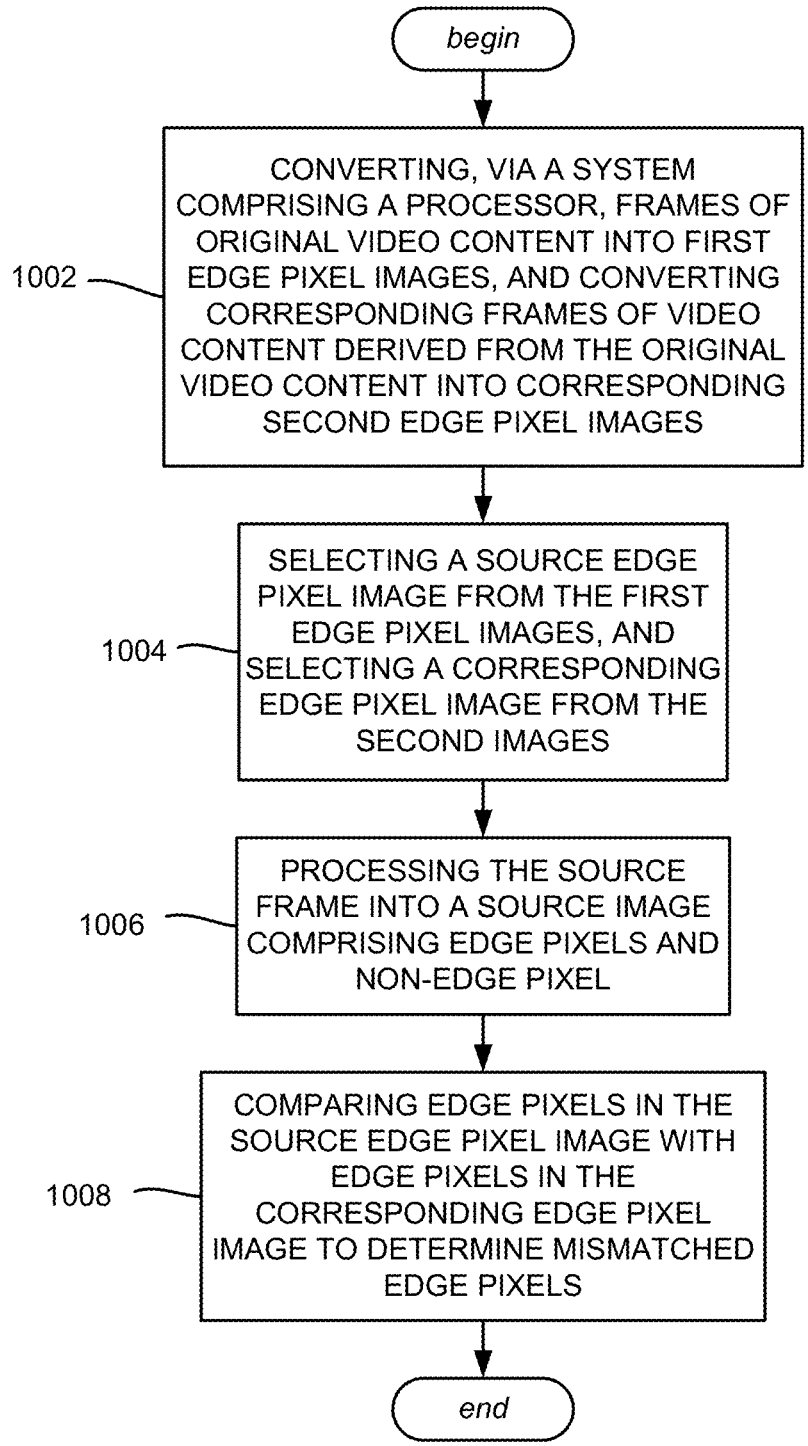
FIG. 10 is a flow diagram of example operations that compare edge pixel images for content differences, in accordance with various aspects and example implementations of the subject disclosure.

One or more example aspects, such as corresponding to operations of a method, are represented in FIG. 10. Operation 1002 represents converting, via a system comprising a processor, frames of original video content into first edge pixel images, and converting corresponding frames of video content derived from the original video content into corresponding second edge pixel images. Operation 1004 represents selecting a source edge pixel image from the first edge pixel images, and selecting a corresponding edge pixel image from the second images. Operation 1006 represents comparing edge pixels in the source edge pixel image with edge pixels in the corresponding edge pixel image to determine mismatched edge pixels. Operation 1008 represents reporting on the mismatched edge pixels.

Aspects can comprise generating a difference image that differentiates the mismatched edge pixels from matched edge pixels.

Comparing the edge pixels in the source edge pixel image with the edge pixels in the corresponding edge pixel image to determine the mismatched edge pixels can comprise selecting at least some edge pixels from the source edge pixel image, and for each selected edge pixel, searching the corresponding edge pixel image in a search window based on a counterpart pixel to determine whether the search window contains an edge pixel. The search window can comprise the counterpart pixel and at least one neighbor pixel to the counterpart pixel.

Figure 11:
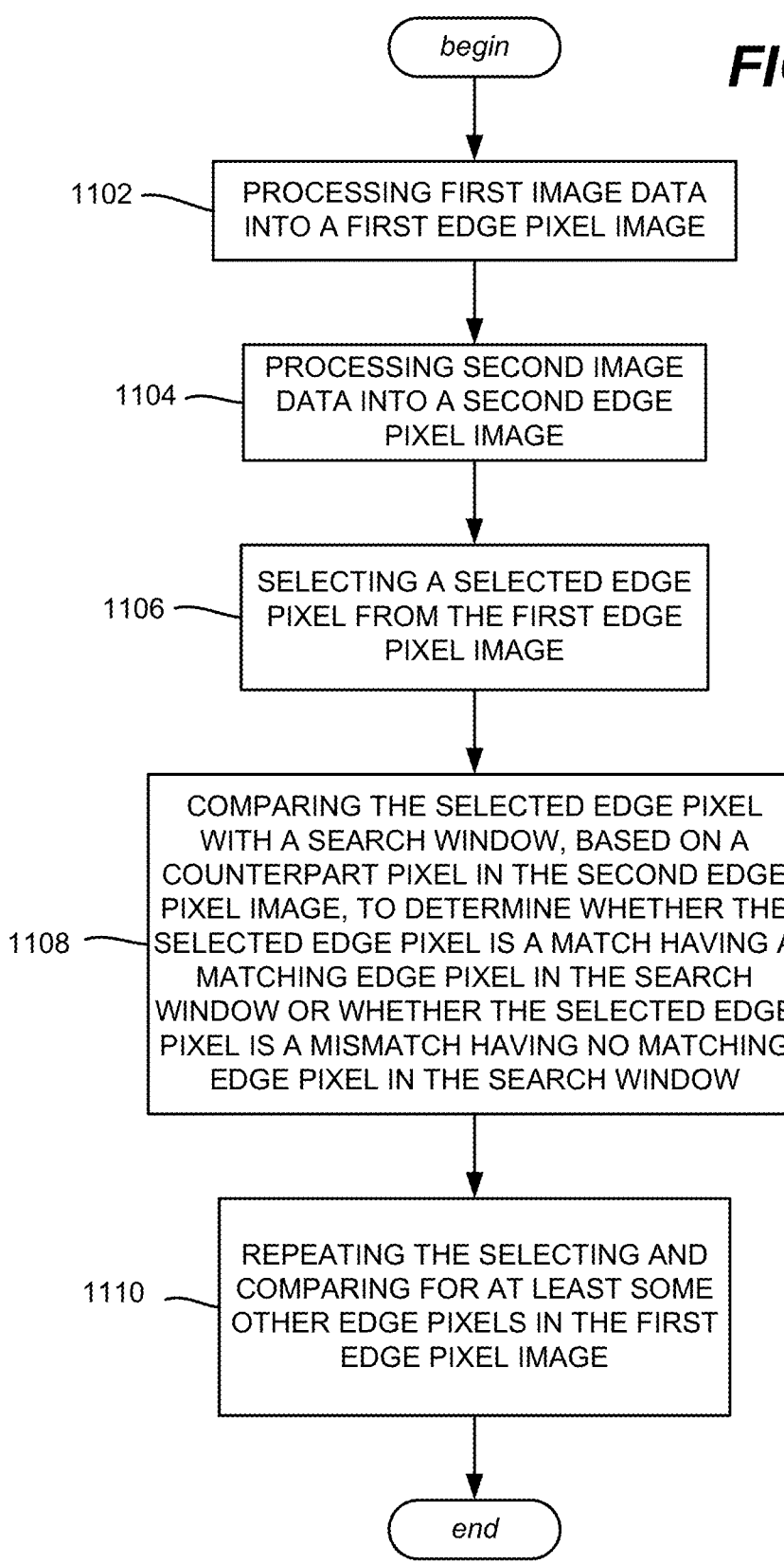
FIG. 11 is a flow diagram of example operations that can be used to compare the pixels in edge pixel images to determine differences between them, in accordance with various aspects and example implementations of the subject disclosure.

FIG. 11 summarizes various example operations, e.g., corresponding to executable instructions of a machine-readable storage medium, in which the executable instructions, when executed by a processor, facilitate performance of the example operations. Operation 1102 represents processing first image data into a first edge pixel image. Operation 1104 represents processing second image data into a second edge pixel image. Operation 1106 represents selecting a selected edge pixel from the first edge pixel image. Operation 1108 represents comparing the selected edge pixel with a search window, based on a counterpart pixel in the second edge pixel image, to determine whether the selected edge pixel is a match having a matching edge pixel in the search window or whether the selected edge pixel is a mismatch having no matching edge pixel in the search window. Operation 1110 represents repeating the selecting and comparing for at least some other edge pixels in the first edge pixel image.

Further operations can comprise reporting information corresponding to match data or mismatch data, or both and match and mismatch data.

Further operations can comprise preparing the first image data, comprising at least one of: performing scaling, performing luminance extraction or performing filtering of source data into the first image data.

Further operations can comprise generating a difference image that differentiates which of the selected edge pixels has a matching edge pixel in the search window and which of the selected edge pixels is a mismatch having no matching edge pixel in the search window.

As can be seen, the described technology operates to detect content differences in a manner that ignores color space and/or EOTF differences when making the difference comparison. Items such as font, object or person scale and position are compared by reducing the image to edges. Those edges are then compared to see if they are overlaying and matching. The difference is scored and if the error percentage is too high, the image is logged and stored for review by a person to either confirm the error or it was a false error. The total amount of work performed is significantly reduced relative to manual methods, with only suspected frames needing to be reviewed. The sensitivity of the match/error can be adjusted by a threshold setting. A score can be determined by noting a ratio of matching versus unmatched pixels.

Because the described technology operates on luminance and edges, the sources can be from almost any source, e.g., DPX, IMF, AS02, Op1a, and any color and EOTF domain. The technology also may be used to determine whether the artifacts in a compressed show can be scored. By changing the threshold and filter, such artifacts can be detected. For example, if the compression had a fault, the image is altered, and the detection can catch this event. If a frame is dropped or repeated it too can be caught.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
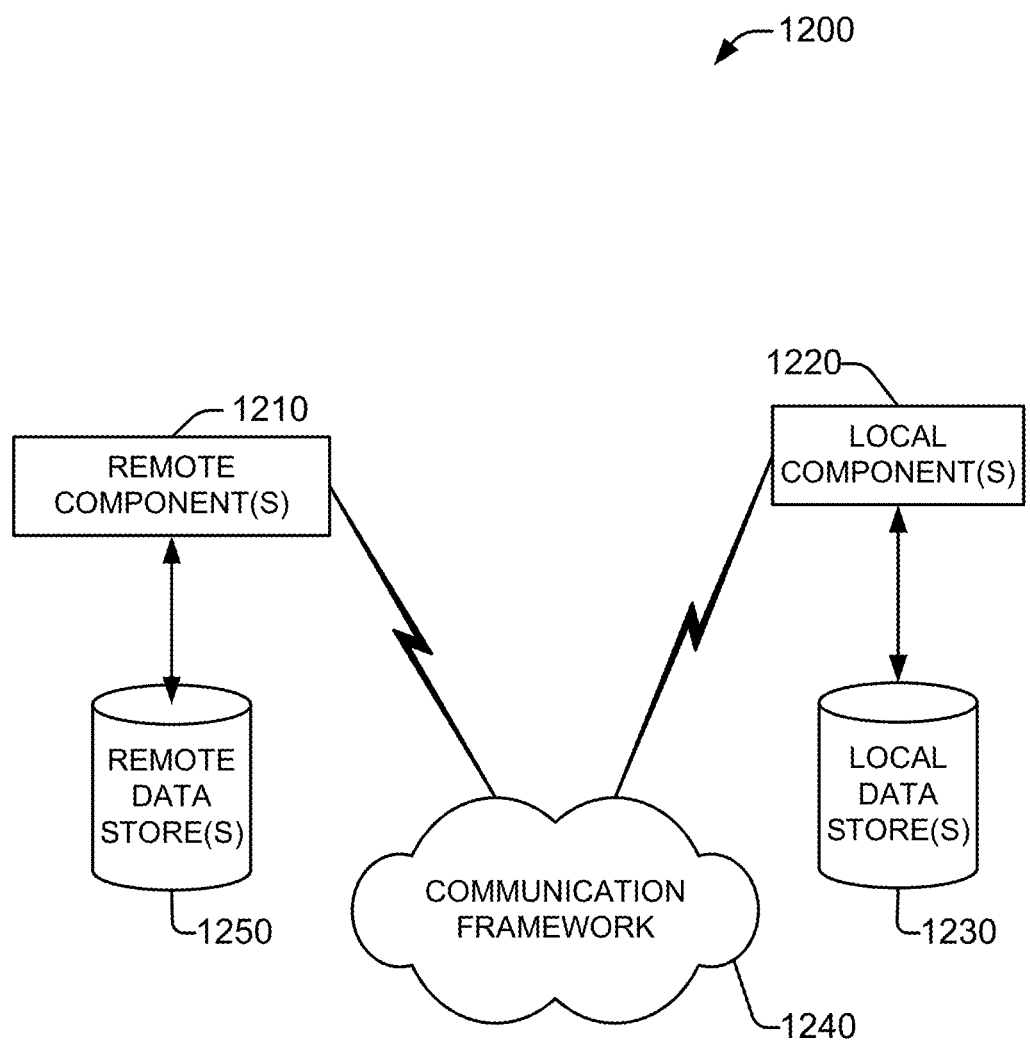
FIG. 12 is a block diagram representing an example computing environment into which aspects of the subject matter described herein may be incorporated.

FIG. 12 thus illustrates a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
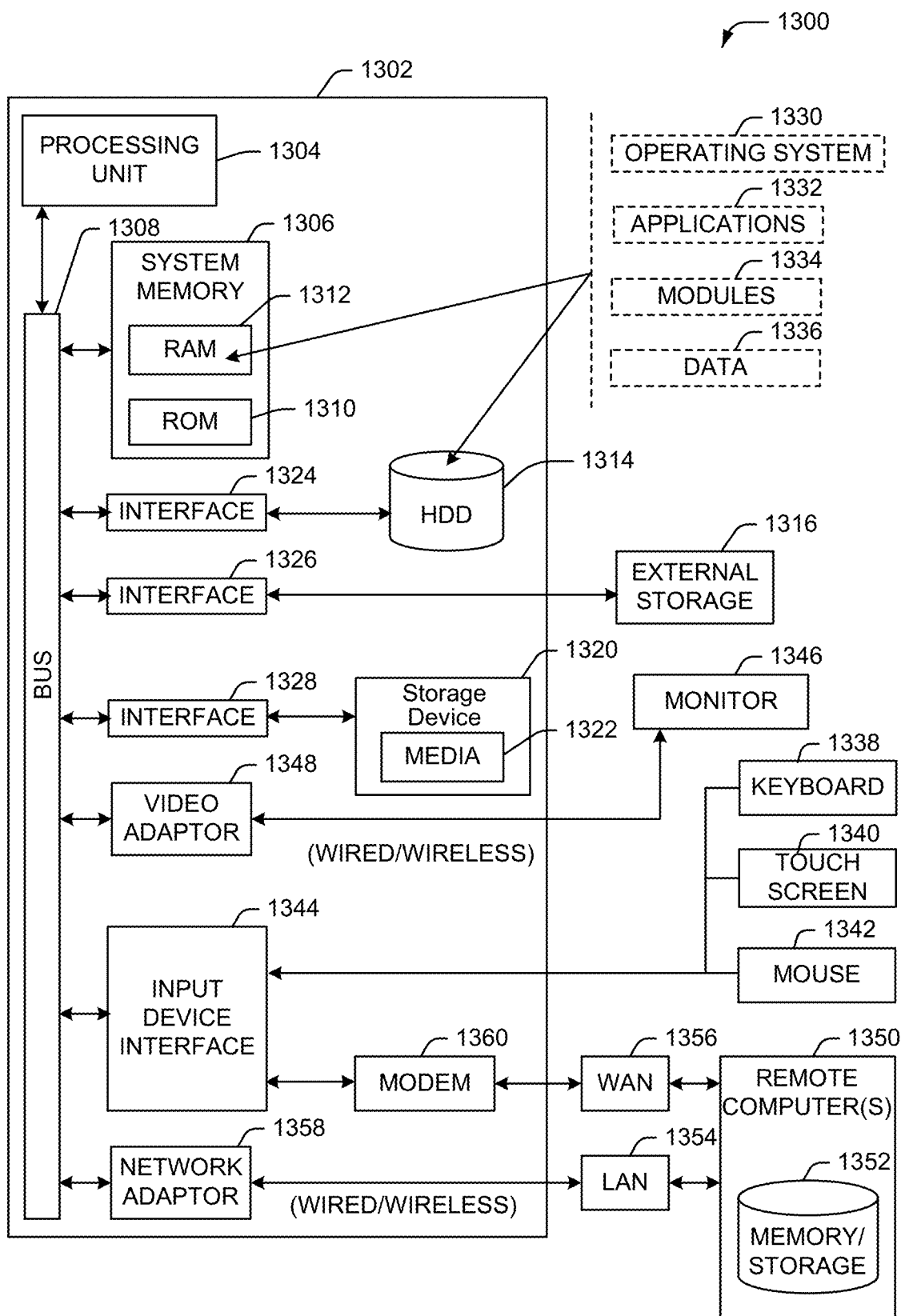
FIG. 13 depicts an example schematic block diagram of a computing environment with which the disclosed subject matter can interact, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
    a processor; and
    a memory that stores executable instructions that, when executed by the processor, facilitate performance of operations, the operations comprising:
        obtaining a source frame from a first group of frames;
        obtaining a counterpart frame from a second group of frames;
        processing the source frame into a source image comprising edge pixels and non-edge pixels;
        processing the counterpart frame into a counterpart image comprising edge pixels and non-edge pixels;
        determining mismatched edge pixels in the counterpart image that do not match corresponding edge pixels of the source image, comprising generating a difference image of matched pixels and mismatched pixels;
        reporting on the mismatched edge pixels, comprising counting the mismatched pixels in the difference image; and
        evaluating an error percentage, based on the counting the mismatched pixels in the difference image, against a threshold error percentage, and if the threshold error percentage is exceeded, flagging the counterpart frame as an error candidate.

2. The system of claim 1, wherein the determining the mismatched edge pixels in the counterpart image that do not match edge pixels of the source image comprises, for an edge pixel of the source image, searching a corresponding pixel in the counterpart image to look for an edge pixel.

3. The system of claim 1, wherein the determining the mismatched edge pixels in the counterpart image that do not match edge pixels of the source image comprises, for an edge pixel of the source image, searching a corresponding pixel and at least one neighboring pixel of the corresponding pixel in the counterpart image to look for an edge pixel.

4. The system of claim 1, wherein the processing the source frame into the source image comprises decoding the source frame into the source image, and wherein the processing the counterpart frame into the counterpart image comprises decoding the counterpart frame into the counterpart image.

5. The system of claim 1, wherein the operations further comprise scaling the counterpart image or scaling the source image.

6. The system of claim 1, wherein the operations further comprise performing luminance extraction on the source image and performing luminance extraction on the counterpart image.

7. The system of claim 1, wherein the operations further comprise filtering the source image and filtering the counterpart image.

8. The system of claim 1, wherein the determining the mismatched edge pixels in the counterpart image comprise searching for mismatched edge pixels in a defined region of interest.

9. The system of claim 1, wherein the first group of frames comprises a segment of frames of an original show, and wherein the second group of frames comprises a corresponding segment of frames of a derivative of the original show.

10. A method comprising:
    converting, via a system comprising a processor, frames of original video content into first edge pixel images, and converting corresponding frames of video content derived from the original video content into corresponding second edge pixel images;
    selecting a source edge pixel image from the first edge pixel images, and selecting a corresponding edge pixel image from the second images;
    comparing edge pixels in the source edge pixel image with edge pixels in the corresponding edge pixel image to determine mismatched edge pixels, comprising generating a difference image of matched pixels and mismatched pixels;
    reporting on the mismatched edge pixels, comprising counting the mismatched pixels in the difference image; and
    evaluating an error percentage, based on the counting the mismatched pixels in the difference image, against a threshold error percentage, and if the threshold error percentage is exceeded, flagging the counterpart frame as an error candidate.

11. The method of claim 10, wherein the generating the difference image differentiates the mismatched edge pixels from matched edge pixels.

12. The method of claim 10, wherein the comparing the edge pixels in the source edge pixel image with the edge pixels in the corresponding edge pixel image to determine the mismatched edge pixels comprises selecting at least some edge pixels from the source edge pixel image, and for each selected edge pixel, searching the corresponding edge pixel image in a search window based on a counterpart pixel to determine whether the search window contains an edge pixel.

13. The method of claim 12, wherein the search window comprises the counterpart pixel and at least one neighbor pixel to the counterpart pixel.

14. A non-transitory machine-readable medium, comprising executable instructions that, when executed by a processor, facilitate performance of operations, the operations comprising:
processing first image data into a first edge pixel image;
processing second image data into a second edge pixel image;
selecting a selected edge pixel from the first edge pixel image;
comparing the selected edge pixel with a search window, based on a counterpart pixel in the second edge pixel image, to determine whether the selected edge pixel is a match having a matching edge pixel in the search window or whether the selected edge pixel is a mismatch having no matching edge pixel in the search window;
repeating the selecting and comparing for at least some other edge pixels in the first edge pixel image;
determining mismatched edge pixels in the counterpart image that do not match corresponding edge pixels of the source image, comprising generating a difference image of matched pixels and mismatched pixels;
reporting on the mismatched edge pixels, comprising counting the mismatched pixels in the difference image; and
evaluating an error percentage, based on the counting the mismatched pixels in the difference image, against a threshold error percentage, and if the threshold error percentage is exceeded, flagging the counterpart frame as an error candidate.

15. The non-transitory machine-readable medium of claim 14, wherein the operations further comprise reporting information corresponding to match data or mismatch data, or both and match and mismatch data.

16. The non-transitory machine-readable storage medium of claim 14, wherein the operations further comprise preparing the first image data, comprising at least one of: performing scaling, performing luminance extraction or performing filtering of source data into the first image data.

17. The non-transitory machine-readable medium of claim 14, wherein the difference image differentiates which of the selected edge pixels has a matching edge pixel in the search window and which of the selected edge pixels is a mismatch having no matching edge pixel in the search window.

18. The non-transitory machine-readable medium of claim 14, wherein the operations further comprise at least one of: scaling the first image data or scaling the second image data.

19. The non-transitory machine-readable medium of claim 14, wherein the operations further comprise at least one of: performing luminance extraction on the first image data or performing luminance extraction on the second image data.

20. The non-transitory machine-readable medium of claim 14, wherein the operations further comprise at least one of: filtering the first image data and filtering the second image data.

* * * * *